April 1, 1969  C. W. HENSCHEN  3,436,069
BEARING ASSEMBLY FOR ELASTIC JOINTS
Filed March 13, 1967
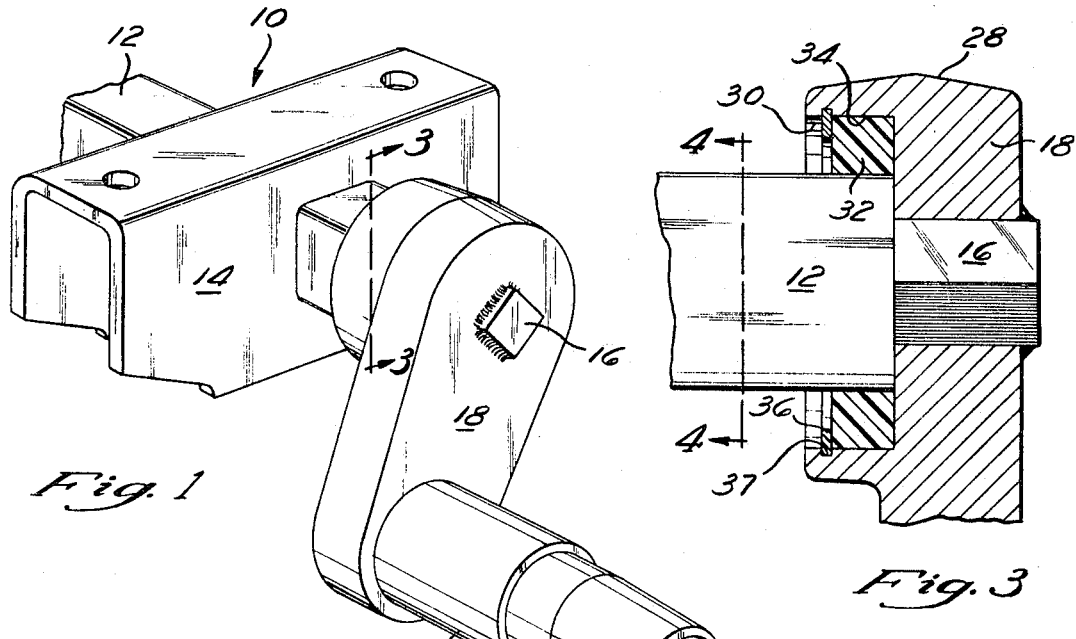
Fig. 1
Fig. 3
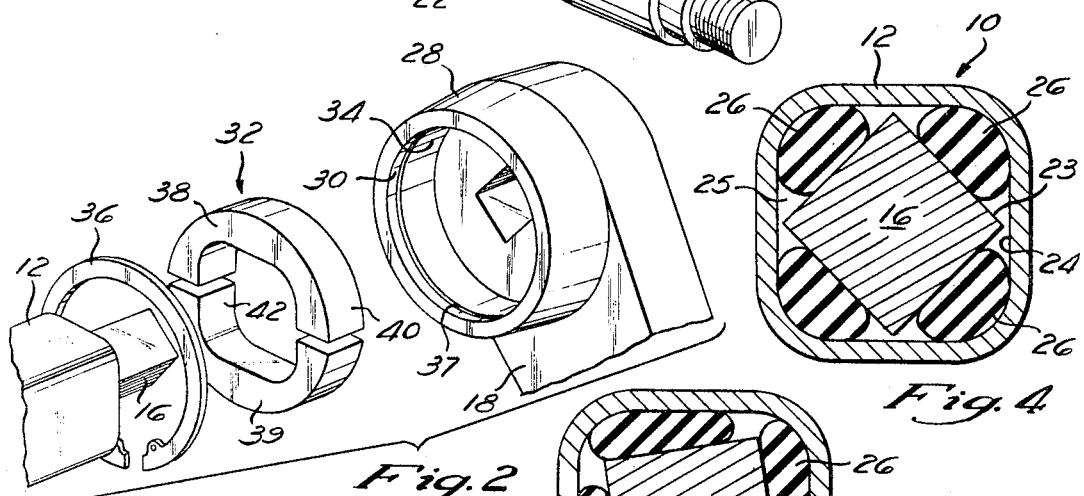
Fig. 2
Fig. 4
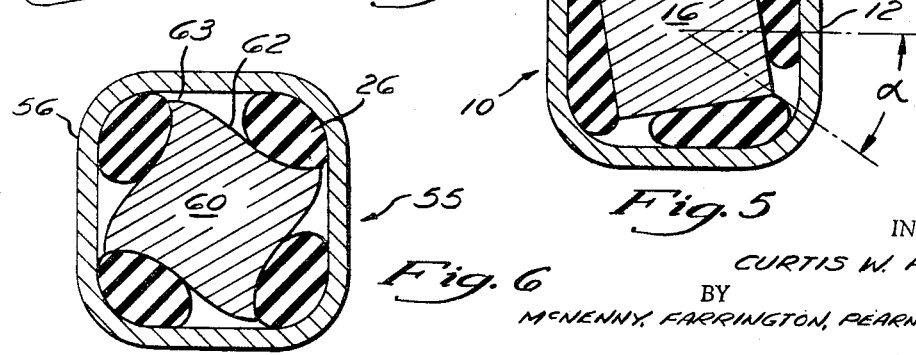
Fig. 6
Fig. 5
INVENTOR.
CURTIS W. HENSCHEN
BY
McNENNY, FARRINGTON, PEARNE & GORDON
ATTORNEYS United States Patent Office 3,436,069
Patented Apr. 1, 1969

3,436,069
BEARING ASSEMBLY FOR ELASTIC JOINTS
Curtis W. Henschen, c/o Henschen Industrial Corporation,
Jackson Center, Ohio 45334
Filed Mar. 13, 1967, Ser. No. 622,666
Int. Cl. B60g 11/18; F16f; B62d
U.S. Cl. 267—57.1                                    10 Claims

ABSTRACT OF THE DISCLOSURE

In combination with an elastic torsion joint having concentrically arranged inner and outer tubular members of a polygonal cross-sectional configuration with the inner member being spaced from the outer member by a plurality of elongated cushioning rollers disposed between an external surface on the inner member and a pair of intersecting internal surfaces of the outer tubular member for the purpose of yieldingly resisting relative rotation of the inner and outer members about a common axis, a load supporting arm connected at one end to the inner member and having an internally cylindrical housing portion surrounding one end of the outer member to define a bearing race therebetween in which is mounted a split bearing element having an outer surface slidingly engaging the interior of the housing portion and having a polygonally-shaped inner surface non-rotatably engaging the exterior of the outer member.

---

This invention relates to improvements in devices utilizing elastic joints of the type employing elastic elements acting between relatively rotatable members for yieldingly resisting such rotation. More particularly, the invention relates to a novel bearing arrangement for maintaining concentricity of the relatively rotatable members of such elastic joints with respect to their common axis under all loading conditions.

Elastic joints of the general type utilized in accordance with the present invention are illustrated in the patents to Hermann J. Neidhart, Nos. 2,712,742 and 2,729,442 issued July 12, 1955 and Jan. 3, 1956. Elastic joints of the type illustrated in these patents generally comprise a pair of concentrically arranged inner and outer tubular members of polygonal shape that are separated from one another by a plurality of resilient, elastic, rubber-like cushioning elements. The cushioning elements are preferably in the form of circular cylinders nested between and engaged by a pair of adjacent, intersecting, internal side surfaces of the outer member and by one exterior side surface of the inner member when no load is applied to the joint. When the joint is torsionally loaded to cause relative rotation between the inner and outer members about their common axis of rotation, a rolling action is imparted to the cushioning elements as they are compressed between the surfaces of the inner and outer members. Under load each cushioning element rolls with no appreciable friction along both of the opposed surfaces between which it is compressed, and the cushioning element is subjected only to compressive stresses.

The cushioning elements of such elastic joints inherently maintain approximate concentricity of the inner and outer members, but are effective for this purpose only under torsional loading. Additional means must be provided to maintain uniform loading and obtain uniform wear of the elastic cushioning elements when the joint is subjected to substantial radial, as well as torsional loading. For example, when the joints are used in a vehicle suspension system, the weight of the suspended vehicle body and frame urges the inner and outer members out of concentricity while subjecting them to torsion forces. The resulting uneven distribution of compression forces on the cushioning elements limits the weight that a given joint can support before the excessively compressed cushioning elements are overloaded. Heretofore, a number of arrangements have been made to maintain this concentricity. One such arrangement has involved mounting a separate bearing assembly outboard of the end of the elastic joint. While this arrangement effectively maintains the concentricity of the inner and outer members, it is not wholly satisfactory in a commercial sense due to the expense involved in manufacturing and installing a separate bearing assembly as well as the difficulty encountered in replacing a worn bearing.

The present invention is an improvement over the heretofore available devices employing such elastic joints in that it provides a bearing and joint assembly that is compact and easily serviceable. For compactness, the bearing element is built into the crank arm of the joint and surrounds one end of the outer member. To facilitate the inspection and replacement of the bearing element, it is located externally of the outer member for easy access from the exterior of the joint and is split into a plurality of segments to permit its removal without requiring the joint to be disassembled. The bearing arrangement is also simple because the outer wall of the bearing race is an integral portion of the crank arm element which interconnects the inner or torsion member and the load-supporting member, such as a wheel of a vehicle. The split bearing element has a circular outer configuration adapted to slidingly engage the outer wall of the bearing race and a central opening having a polygonal configuration corresponding to the external configuration of the outer tubular member of the elastic joint so that the only sliding engagement takes place between the outer periphery of the bearing element and the outer wall of the bearing race and not between the bearing element and the outer member of the elastic joint.

It is an important object of the present invention to provide an improved device employing an elastic torsion joint.

It is another important object of this invention to provide an improved bearing arrangement for maintaining the concentricity between the concentrically arranged elements of an elastic joint.

It is a further object of this invention to provide a novel and improved bearing arrangement for an elastic joint which is readily accessible for inspection and replacement.

It is a still further object of this invention to provide a bearing assembly of simplified design for an elastic joint that is economical to manufacture and assemble and is rugged and durable in use.

The above and still other objects, advantages and characteristic features of the invention will be more fully understood by reference to the following detailed description of an illustrative embodiment of the invention, taken in conjunction with the accompanying drawing in which:

FIGURE 1 is a perspective view of a device such as a simple vehicle suspension system embodying the principles of the present invention and utilizing an elastic joint;

FIGURE 2 is an exploded view showing the bearing arrangement of the present invention;

FIGURE 3 is a longitudinal cross section of the bearing arrangement taken along line 3—3 in FIGURE 1;

FIGURE 4 is a transverse cross section taken along line 4—4 of FIGURE 3 and showing the cushion elements at rest;

FIGURE 5 is a transverse cross section showing the cushioning elements of FIGURE 4 under load; and, FIGURE 6 is a transverse cross section similar to that of FIGURE 4 showing a modified cross-sectional configuration for the inner member.

FIGURE 1 illustrates one end of an elastic torsion joint 10 as arranged in a simple vehicle suspension system or the like. The illustrated elastic joint 10 includes a tubular outer member 12 adapted to be mounted transversely of a vehicle body (not shown) by a bracket 14 secured to the body by suitable fastener means (not shown). Mounted concentrically within the outer member 12 is an inner member or torsion shaft 16 having a crank arm 18 includes a spindle 22 for receiving a suitable arm 10 includes a spindle 22 for receiving a suitable vehicle support means, such as a wheel. The spindles 22 are spaced from the torsion shaft 16 along the crank arm to provide a moment arm through which the weight of the vehicle acts to apply a torque to the torsion shaft.

In the no-load condition illustrated in FIGURE 4, the outer tubular member 12 surrounds the inner torsion shaft 16 with the external side surface 23 of the inner member opposite the apices defined by the junctions between the internal side surfaces 24 of the outer member to form four generally triangular pockets 25 in which a corresponding number of resilient elastic rubber-like cushioning elements 26 are disposed with their longitudinal axes parallel to the common axis of the inner and outer members. Both the inner torsion shaft 16 and the outer tubular member 12 are substantially square in cross section with a longitudinal juncture of their side surfaces being more or less rounded to eliminate sharp external edges or corners which could damage the cushioning element 26.

Since the outer member 12 is rigidly secured to the vehicle body by means of the bracket 14 and the torsion shaft 16 is connected to the wheels of the vehicle through the crank arm 18, the load of the vehicle body is transmitted to the vehicle wheels mounted on the spindles 22 through the crank arm 18. The resulting torque causes the torsion shaft to rotate with respect to the outer member through an angle varying with the weight of the vehicle body and its load. With the outer member 12 rigidly held against rotation, deflection of the crank arm 18 in a clockwise direction through an angle $\alpha$ will cause the inner member 16 to rotate through the same angle to the loaded condition illustrated in FIGURE 5.

Such relative rotation of the inner member with respect to the outer member is resisted by the cushioning elements 26, each of which tends to rotate counter-clockwise as shown in FIGURES 4 and 5 and roll along the original engaging side of the inner member and one of the original engaging sides of the outer member. In this manner, the cushioning elements are subjected substantially only to compression between two surfaces, which surfaces approach a substantially parallel, dead-center relationship with $\alpha$ equal to 45° (where the inner and outer members 12 and 16 are square in transverse section). So long as the maximum compression at the dead-center position is not reached, the parts will move back to their original positions upon removal of the applied torque.

FIGURE 6 shows a modified elastic joint 55 employing a torsion shaft 60 having an alternative cross-sectional configuration. In this embodiment, the symmetrically arranged side surfaces 62 of the torsion shaft 60 have been curved and provided with slight projections 63 to extend the effective length of the side surfaces 62 thus, increasing the angle through which the inner and outer members 56 and 60 can safely rotate without increasing the overall dimensions of the outer member.

Of the elastic joint forms illustrated, the form shown in FIGURE 6 requires that the concentricity be maintained more closely between the inner and outer members 56 and 60, respectively, to insure trouble-free operation of the joint.

FIGURES 2 and 3 illustrate a compact bearing arrangement for maintaining the concentricity between the common axis of the inner and outer members 12 and 16. The bearing arrangement includes a housing 28 formed as an integral portion of the crank arm 18 and defining a bearing recess or race 30 extending transversely of the crank arm for receiving a split bearing element 32. The internal wall of the housing 28 is slidingly engaged by an external surface of the bearing element 32. The bearing element 32 is axially positioned within the recess 30 by a retainer ring 36 disposed in a groove 37 located outwardly of the bearing race 34.

To facilitate its installation and replacement, the bearing element 32 is preferably divided at one or more places so that it may be slipped over the outer member without disassembling the joint. In the illustrated embodiment, the bearing element 32 is divided into two segments 38 and 39, the outer peripheries of which define a circular cylindrical surface 40 for slidingly engaging the cylindrical inner wall surface of the housing 28 with a minimum of friction as the crank arm 18 rotates relative to the outer member 12. The inner peripheries of the segments 38 and 39 define a polygonally-shaped central opening 42, the configuration of which corresponds to that of the exterior of the outer member 12. Thus, bearing element 32 is non-rotatably secured to the exterior of the outer member 12, and the only sliding engagement in the bearing arrangement occurs between the outer periphery of the bearing element 32 and the outer wall of the bearing race 34. The segments 38 and 39 of the bearing element 32 are preferably made of a nylon or other suitable bearing material requiring a minimum of lubrication to operate effectively.

With the above-described bearing arrangement, it is not necessary to machine the exterior of the outer member 12 or otherwise prepare it to receive the bearing element 32. Thus, the manufacture of the elastic joints is rendered simpler and more economical, for it is necessary only to cut the inner and outer tubular members 12 and 16 to their proper lengths prior to securing the crank arm and bearing assembly to the end of the inner member 16.

If it should be necessary at any time to replace one or both of the bearing segments 38 and 39, one need only release the retainer ring 36 from the groove 37, remove one or both of the old segments 38 and 39 by sliding it axially out of the race 34, and replace the removed segment or segments in the reverse manner. All of this can be accomplished quickly from the exterior of the elastic joint without removing the crank arm 18 or otherwise disassembling the elastic joint. When the device is employed where the major load occurs only in one direction, it is often necessary to replace only one of the bearing segments. For example, in the illustrated vehicle suspension system, the weight of the vehicle and any load therein would cause the lower segment 39 to sustain the greatest wear and require replacement sooner than the upper segment 38.

Although a particular, preferred form of the flexible coupling and bearing arrangement has been shown and described herein, the invention is not limited thereto, as should be apparent to one skilled in the art. Thus, putting aside questions of cost of the component parts, the inner and outer members 12 and 16 may preferably, in some instances, have configurations other than those illustrated, with the resulting obvious differences in the number of cushioning elements, in the configuration of the symmetrically-arranged internal and external side surfaces on the outer and inner members, and in the configuration of the bearing element. Examples of three-sided and six-sided designs are disclosed in the aforementioned U.S. Patent No. 2,712,742 of Herman J. Neidhart, and other variations of the same basic type of flexible coupling are disclosed in U.S. Patent No. 2,729,442 of Herman J. Neidhart, granted Jan. 3, 1956.

In addition to the type of flexible coupling in the aforementioned patents to Herman J. Neidhart, other basically different coupling designs may be used in accordance with the present invention, although the particular designs mentioned above are preferred, both from the standpoint of cost and operating characteristics, for practically all applications of the present invention which are likely to be encountered in the broad field of torque transmission. Nevertheless, a variety of other forms of flexible couplings are capable of being used in accordance with the general principles of the present invention, and illustrative examples of other coupling designs appear in the following U.S. patents: No. 2,388,450, granted Nov. 6, 1945, to Glenn S. Thompson; No. 2,363,469, granted Nov. 21, 1944, to Max Goldschmidt; No. 2,189,870, granted Feb. 13, 1940, to Nicolaas Sluyter; No. 1,746,217, granted Feb. 4, 1930, to Axel J. Jansson; No. 1,646,427 granted Oct. 25, 1927, to Benjamin Skikmore, Jr.; No. 1,633,580, granted June 28, 1927, to Charles Froesch; No. 1,590,055, granted June 22, 1926, to William E. Porter; and No. 1,425,616, granted Aug. 15, 1922, to Gurdon L. Tarbox.

From the foregoing description of the present invention as applied to an illustrative application and embodiment thereof, and from the variations thereof which have been specifically mentioned, by way of examples, it will be apparent that a novel bearing arrangement for an elastic torsion joint has been disclosed which is susceptible to numerous modifications while accomplishing the general objectives and achieving the advantage also set forth above.

What is claimed is:

1. In combination with an elastic joint comprising an outer tubular member, an inner member disposed generally concentrically within and spaced from the outer member for rotation relative thereto about a common axis, and means disposed within the outer member and interacting between it and the inner member to effect a yieldable restraint against relative rotation of the outer and inner members about said common axis; a bearing arrangement for positively maintaining the inner and outer members concentric with respect to said common axis of relative rotation and including housing means rigidly secured to said inner member for rotation therewith relative to said outer member and, together with said outer member, defining a bearing race about said outer member, and a bearing element disposed within said bearing race to maintain the inner and outer members concentric with respect to said axis.

2. A device as set forth in claim 1 wherein the external cross-sectional configuration of said outer member is non-circular and said bearing element is provided with a central opening therethrough having a generally non-circular configuration that surrounds and embraces the outer member in relatively non-rotatable engagement therewith.

3. A device as set forth in claim 1 or claim 2 wherein said bearing element is longitudinally split into separable portions to facilitate its installation in said bearing race about said outer member.

4. A device as set forth in claim 1 wherein said inner member includes a load-bearing arm projecting generally radially therefrom and rigidly connected thereto, and said housing member constitutes an integral extension of said load-bearing arm.

5. A device as set forth in claim 1 wherein said housing means is located adjacent one end of said inner member and surrounds an exterior surface portion of said outer member, and said bearing element is disposed and acts between said housing element and said surface portion of said outer member as one rotates relative to the other said common axis.

6. A device as set forth in claim 1 wherein said bearing element is longitudinally divided to facilitate its installation in said bearing race from the exterior of said elastic joint.

7. A device as set forth in claim 2 wherein said bearing element is longitudinally divided into separable parts to facilitate its installation in said bearing race from the exterior of said elastic joint without axially displacing the housing member relative to the inner and outer members.

8. In combination with an elastic joint comprising an outer tubular member having a plurality of annularly symmetrically arranged internal surfaces defining an opening therethrough, an inner member generally concentrically disposed within said opening through said outer member and spaced from the outer member for rotation relative thereto about a common axis, said inner member having a plurality of annularly symmetrically-arranged external surfaces each of which is normally oriented to face radially outwardly toward a pocket formed by the juncture between two of said internal surfaces on said outer member, and a plurality of elastic, cushioning elements normally disposed under radial compression between said external surfaces on said inner member and said internal surfaces of said outer member; a bearing element non-rotatably secured about the outer periphery of said outer member, and means defining a bearing race secured to said inner member for rotation therewith and slidably engaging said bearing element to maintain said inner and outer members concentric relative to said common axis of rotation.

9. In combination with an elastic joint comprising an outer tubular member, an inner member disposed generally concentrically within and spaced from the outer member for rotation relative thereto about a common axis, and a plurality of elastic cushioning members disposed between the interior of the outer member and the exterior of the inner member for yieldingly holding them generally concentric and yieldingly restraining relative rotation thereof; a bearing arrangement for maintaining the inner and outer members concentric with said common axis of relative rotation and including a bearing recess defined by portions of said inner and outer members, said bearing recess being open at one end, a bearing element disposed within said bearing recess to maintain concentricity of the inner and outer members, and releasable means retaining said bearing element in said recess against endwise removal.

10. In combination with an elastic joint comprising an outer tubular member, an inner member disposed generally concentrically within the outer member and spaced therefrom for rotataion relative thereto about a common axis, and a plurality of elastic rollers disposed between the interior of the outer member and the exterior of the inner member in substantially uniformly spaced relationship about the inner member, said outer member having a regular polygonal inner profile in a transverse plane providing substantially flat, roller-engaging surfaces having axially-extending junctions, the sides of said inner member, in transverse section, substantially defining a symmetrical, closed, polygonal figure the number of roller-engaging sides of which correspond to the number on said outer member and having protuberances at the junctions of adjacent sides, said protuberances providing roller-engaging extensions of the sides of the inner member beyond the sides of a regular polygonal figure in the same peripheral direction with respect to said common axis; a bearing arrangement for maintaining the inner and outer members concentric with said common axis of relative rotation, including housing means secured to said inner member and overlying a portion of the exterior of said outer member to define a bearing recess surrounding said outer member, a longitudinally split bearing element disposed within said bearing recess and provided with a cylindrical outer peripheral surface and a central opening therethrough having a non-circular configuration generally corresponding to and closely embracing said outer member, whereby said bearing element slidably engages said housing member and nonrotatably engages said outer member, and releasable means retaining said bearing element in said bearing recess against endwise removal.

References Cited

UNITED STATES PATENTS

| | | | |
|---|---|---|---|
| 1,865,202 | 6/1932 | Milligan | 280—96 |
| 2,729,442 | 1/1956 | Neidhart | 267—21 |
| 3,026,558 | 3/1962 | Mulholland | 16—44 |

DRAYTON E. HOFFMAN, *Primary Examiner.*

U.S. Cl. X.R.

64—27; 267—1; 280—124

U.S. DEPARTMENT OF COMMERCE

PATENT OFFICE

Washington, D.C. 20231

UNITED STATES PATENT OFFICE
CERTIFICATE OF CORRECTION

Patent No. 3,436,069                                                               April 1, 1969

Curtis W. Henschen

It is certified that error appears in the above identified patent and that said Letters Patent are hereby corrected as shown below:

Column 3, line 26, after "18" insert -- secured on each end by a weld 20. Each crank arm 18 --; line 27, cancel "arm 10 includes a spindle 22 for receiving a suitable". Column 6, line 5, after "other" insert -- about --.

Signed and sealed this 7th day of April 1970.

(SEAL)
Attest:

Edward M. Fletcher, Jr.                                       WILLIAM E. SCHUYLER, JR.
Attesting Officer                                                         Commissioner of Patents